United States Patent
Chaudhry et al.

(10) Patent No.: US 6,684,398 B2
(45) Date of Patent: Jan. 27, 2004

(54) MONITOR ENTRY AND EXIT FOR A SPECULATIVE THREAD DURING SPACE AND TIME DIMENSIONAL EXECUTION

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 564 days.

(21) Appl. No.: 09/761,326

(22) Filed: Jan. 16, 2001

(65) Prior Publication Data

US 2003/0208673 A1 Nov. 6, 2003

Related U.S. Application Data

(60) Provisional application No. 60/208,430, filed on May 31, 2000.

(51) Int. Cl.[7] .............................................. G06F 9/00
(52) U.S. Cl. ............... 718/106; 718/107; 719/315; 719/316; 711/6; 711/145; 711/146
(58) Field of Search ................... 718/100, 101, 718/102, 103, 104, 105, 106, 107, 108, 1; 719/315, 316; 711/6, 119, 125, 128, 129, 133, 147, 203

(56) References Cited

U.S. PATENT DOCUMENTS

| | | | | |
|---|---|---|---|---|
| 5,692,193 A | * | 11/1997 | Jagannathan et al. | 709/106 |
| 6,345,351 B1 | * | 2/2002 | Holmberg | 711/203 |
| 6,351,778 B1 | * | 2/2002 | Orton et al. | 709/310 |
| 6,370,622 B1 | * | 4/2002 | Chiou et al. | 711/146 |
| 6,411,616 B1 | * | 6/2002 | Donahue et al. | 370/352 |
| 6,574,725 B1 | * | 6/2003 | Kranich et al. | 712/31 |
| 6,606,742 B1 | * | 8/2003 | Orton et al. | 717/140 |

FOREIGN PATENT DOCUMENTS

| | | |
|---|---|---|
| GB | 2 321 544 A | 7/1998 |
| WO | WO 98/33119 | 7/1998 |
| WO | WO 00/70451 | 11/2000 |

\* cited by examiner

*Primary Examiner*—Majid A. Banakhah
(74) *Attorney, Agent, or Firm*—Park, Vaughan & Fleming LLP

(57) ABSTRACT

One embodiment of the present invention provides a system that facilitates entering and exiting a critical section of code for a speculative thread. The system supports a head thread that executes program instructions, and the speculative thread that speculatively executes program instructions in advance of the head thread. During an entry into the critical section by the speculative thread, the system increments a variable containing a number of virtual locks held by the speculative thread. Note that a virtual lock held by the speculative thread is associated with the critical section and is used to keep track of the fact that the speculative thread has entered the critical section. Also note that this virtual lock does not prevent the speculative thread or other threads from entering the critical section. During an exit from the critical section by the speculative thread, the system decrements the variable containing the number of virtual locks held by the speculative thread. The speculative eventually receives a request to perform a join operation with the head thread to merge state associated with the speculative thread into state associated with the head thread. Upon receiving this request, the speculative thread waits to perform the join operation until the variable containing the number of virtual locks held by the speculative thread equals zero. In one embodiment of the present invention, the system additionally waits to perform the join operation until no virtual locks in a list of virtual locks accessed by the speculative thread are held by the other head threads.

22 Claims, 7 Drawing Sheets

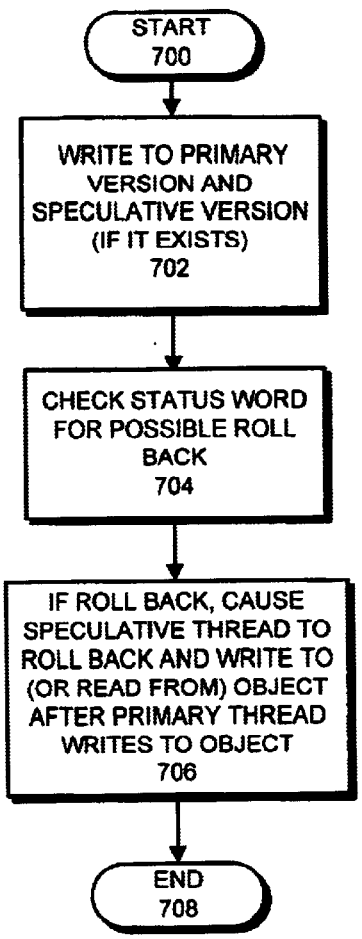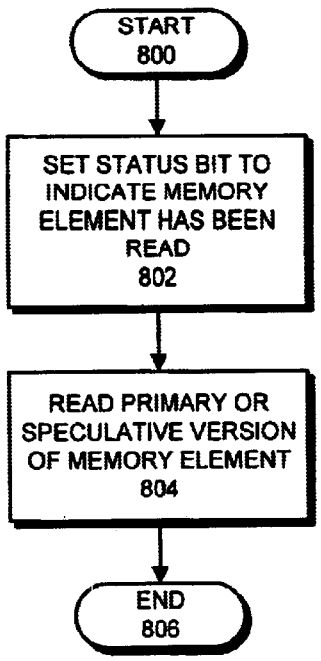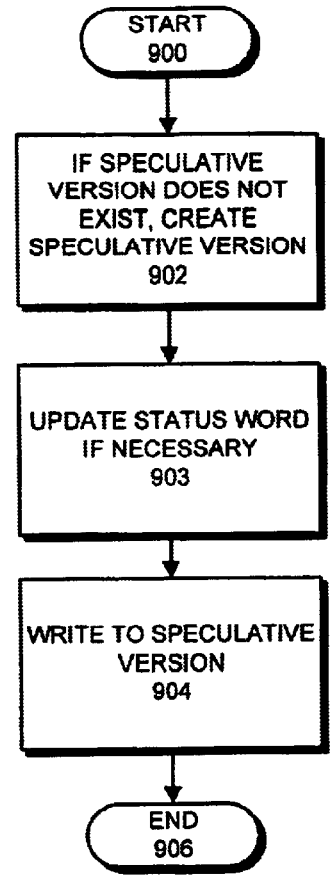
FIG. 7
FIG. 8
FIG. 9

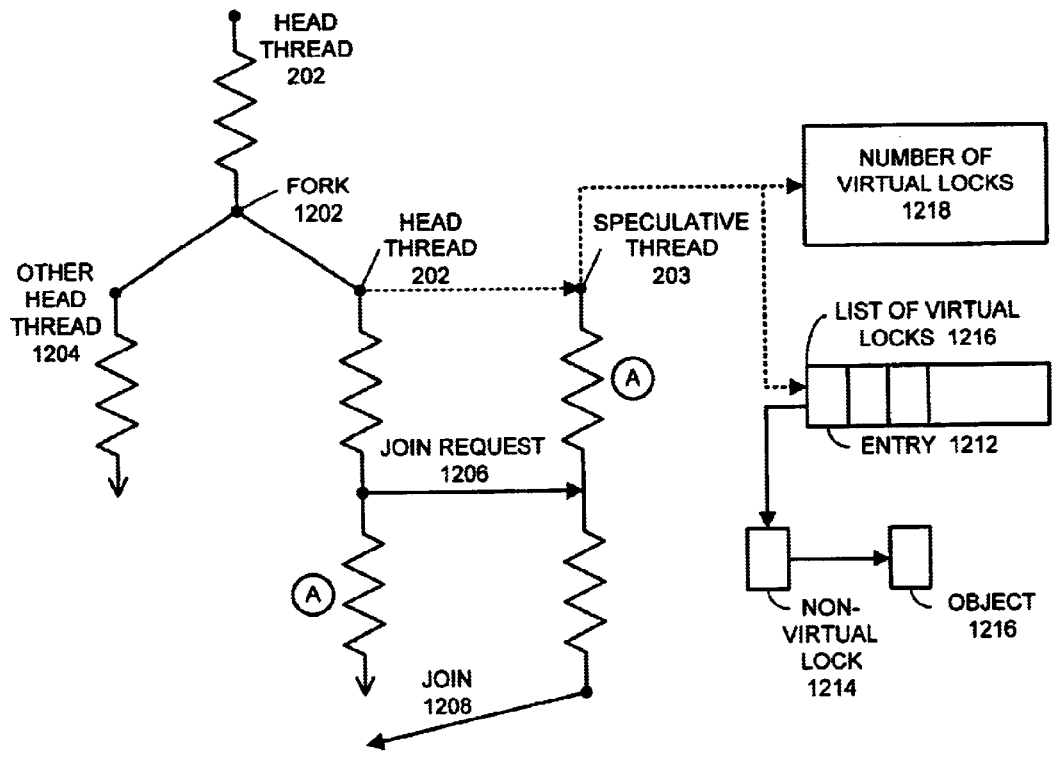
FIG. 12
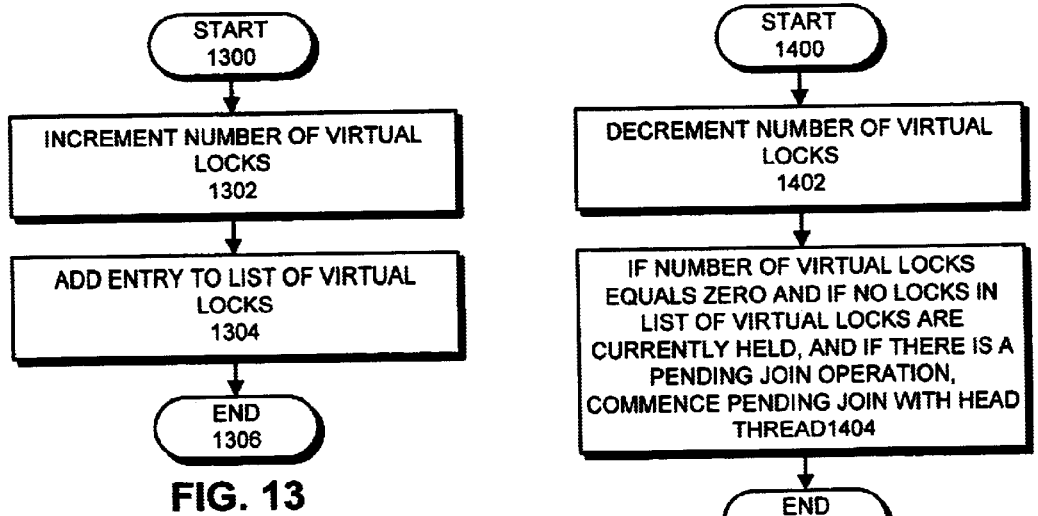
FIG. 13
FIG. 14

MONITOR ENTRY AND EXIT FOR A SPECULATIVE THREAD DURING SPACE AND TIME DIMENSIONAL EXECUTION

RELATED APPLICATION

This application hereby claims priority under 35 U.S.C. §119 to U.S. Provisional Patent Application No. 60/208,430 filed May 31, 2000.

BACKGROUND

1. Field of the Invention

The present invention relates to operating systems for computers. More specifically, the present invention relates to a method and an apparatus for handling monitor entry and exit operations in order to restrict accesses to critical sections for a speculative thread that speculatively executes program instructions in advance of a head thread during space and time dimensional program execution.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

One challenge in designing a system that supports speculative execution is to provide an efficient mechanism to restrict access to critical sections. In non-speculative systems, this is typically accomplished by using a lock, such as a monitor or a semaphore to restrict access to critical sections. Unfortunately, the process of acquiring and releasing locks can seriously degrade computer system performance, because acquiring and releasing a lock may cause a cache miss, and may require load buffers and/or store buffers for the processor to be flushed. Consequently, the process of acquiring or releasing a lock may take up to hundreds of processor clock cycles. Also, if a single thread is executing multithreaded library routines that manipulate locks, the effort in acquiring and releasing locks is wasted, because the locks are not required for single-threaded execution.

Hence, what is needed is a method and an apparatus for handling accesses to critical sections for a speculative thread without incurring unnecessary overhead in acquiring and releasing associated locks.

SUMMARY

One embodiment of the present invention provides a system that facilitates entering and exiting a critical section of code for a speculative thread. The system supports a head thread that executes program instructions, and the speculative thread that speculatively executes program instructions in advance of the head thread. During an entry into the critical section by the speculative thread, the system increments a variable containing a number of virtual locks held by the speculative thread. Note that a virtual lock held by the speculative thread is associated with the critical section and is used to keep track of the fact that the speculative thread has entered the critical section. Also note that this virtual lock does not prevent the speculative thread or other threads from entering the critical section. During an exit from the critical section by the speculative thread, the system decrements the variable containing the number of virtual locks held by the speculative thread. The speculative eventually receives a request to perform a join operation with the head thread to merge state associated with the speculative thread into state associated with the head thread. Upon receiving this request, the speculative thread waits to perform the join operation until the variable containing the number of virtual locks held by the speculative thread equals zero.

In one embodiment of the present invention, the system additionally supports other head threads that execute program instructions for a parallel computational task in parallel with the head thread. In this embodiment, during the entry into the critical section by the speculative thread, the system additionally adds an entry for the virtual lock associated with the critical section into a list of virtual locks visited by the speculative thread. Upon receiving the request to perform the join operation, the system waits to perform the join operation until no virtual locks in the list of virtual locks are held by the other head threads. In a variation on this embodiment, the system waits to perform the join operation by using the head thread to acquire non-virtual locks associated with virtual locks in the list of virtual locks. In a variation on this embodiment, the entry for the virtual lock in the list of virtual locks contains an identifier for a corresponding non-virtual lock for the critical section, wherein the non-virtual lock is used to ensure mutual exclusion amongst the head thread and the other head threads working on the parallel computational task.

In one embodiment of the present invention, upon receiving a request to perform a write operation by the head thread, the system performs the write operation to a primary version of the memory element. The system also checks status information associated with the memory element to determine if the memory element has been read by the speculative thread. If the memory element has been read by the speculative thread, the system causes the speculative thread to roll back so that the speculative thread can read a result of the write operation. If the memory element has not been read by the speculative thread, the system performs the write operation to a space-time dimensioned version of the memory element if the space-time dimensioned version exists.

In one embodiment of the present invention, performing the join operation includes merging the space-time dimensioned version of the memory element into the primary version of the memory element and discarding the space-time dimensioned version of the memory element.

In one embodiment of the present invention, the memory element includes an object defined within an object-oriented programming system.

In one embodiment of the present invention, the head thread and the speculative thread perform the join operation in parallel.

BRIEF DESCRIPTION OF THE FIGURES

FIG. 7 is a flow chart illustrating operations involved in performing a write to a memory element by a head thread in accordance with an embodiment of the present invention.

FIG. 8 is a flow chart illustrating operations involved in performing a read to a memory element by a speculative thread in accordance with an embodiment of the present invention.

FIG. 9 is a flow chart illustrating operations involved in performing a write to a memory element by a speculative thread in accordance with an embodiment of the present invention.

FIG. 12 illustrates how a speculative thread keeps track of locks in order to decide when to commence a join operation in accordance with an embodiment of the present invention.

FIG. 13 is a flow chart illustrating the process of performing a monitor entry in accordance with an embodiment of the present invention.

FIG. 14 is a flow chart illustrating the process of performing a monitor exit in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
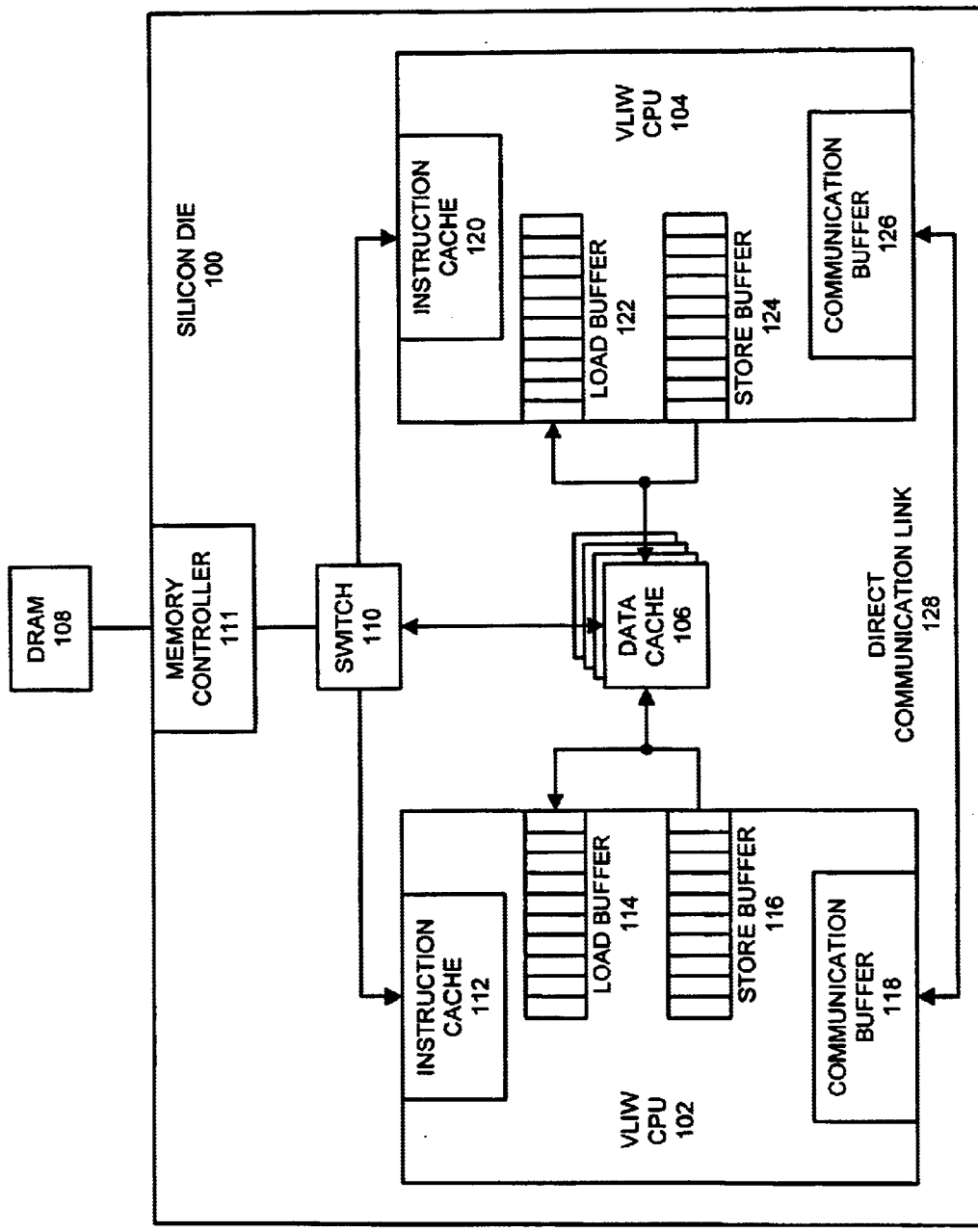
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
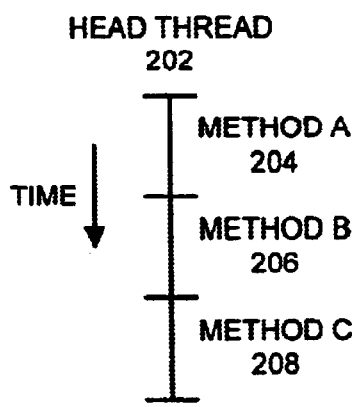
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
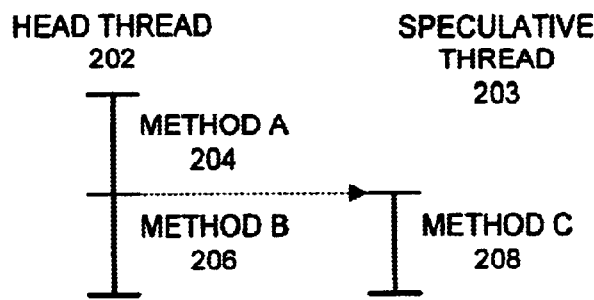
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B 206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
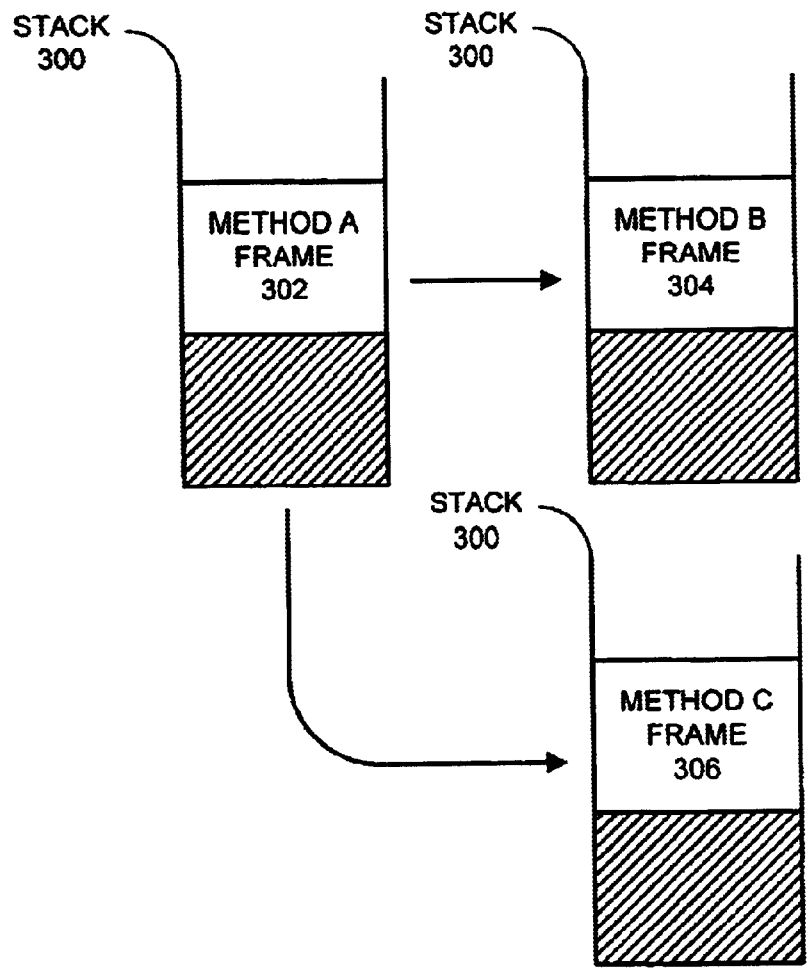
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention.

Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java byte code into machine code for the specific computing platform. Alternatively, a Java byte code can be executed directly on a Java byte code engine running on the specific computing platform.

Fortunately, a Java byte code contains more syntactic information than conventional machine code. In particular, the Java byte codes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
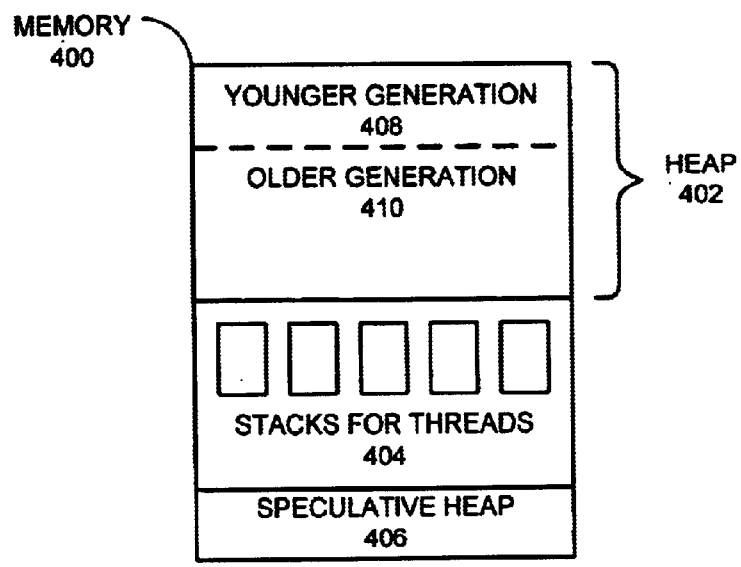
FIG. 4 illustrates how memory is partitioned between stack and heap in accordance with an embodiment of the present invention.
Figure 5:
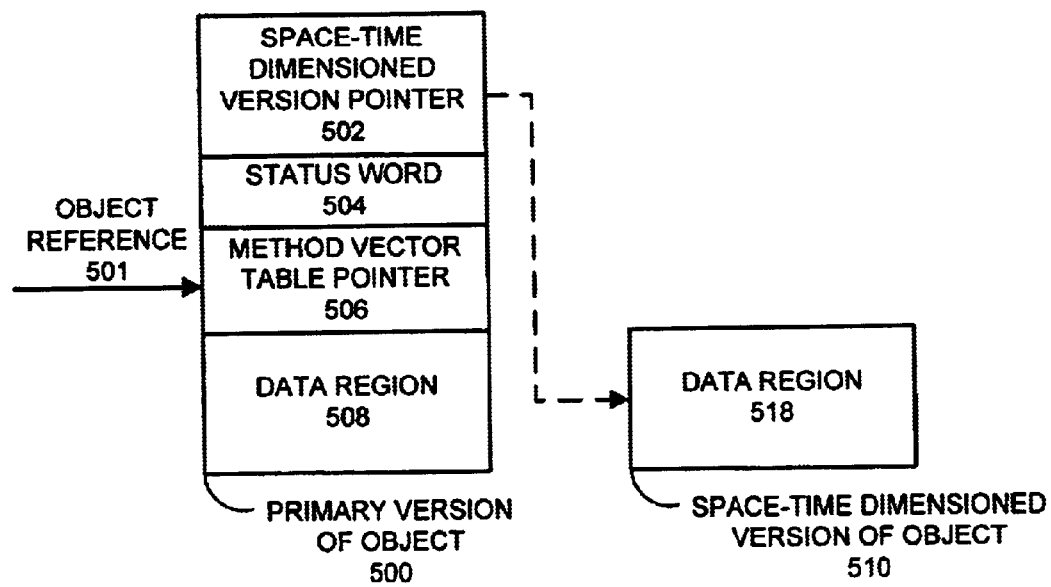
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
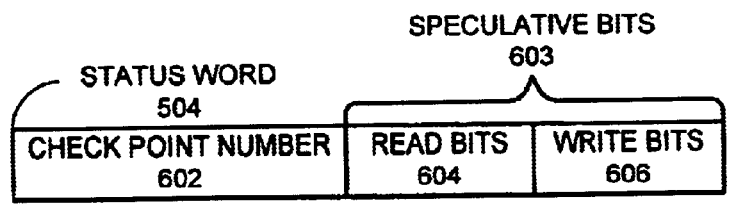
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

Figure 10:
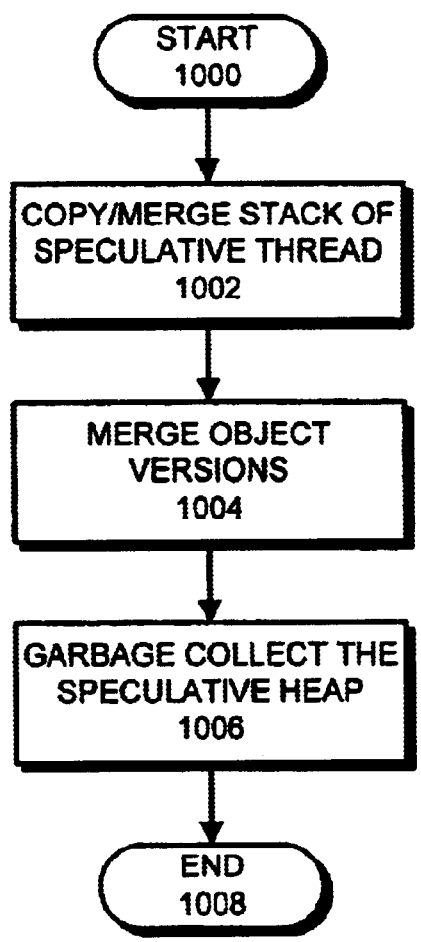
FIG. 10 is a flow chart illustrating operations involved in performing a join between a head thread and a speculative thread in accordance with an embodiment of the present invention.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

Figure 11:
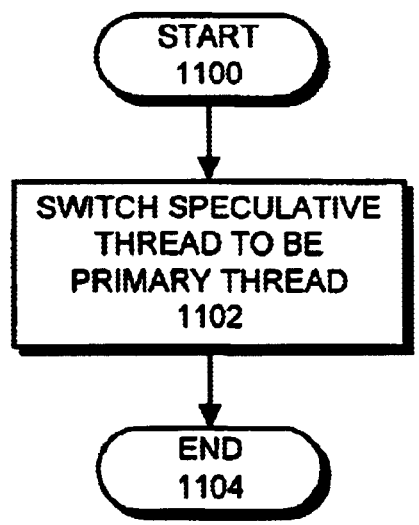
FIG. 11 is a flow chart illustrating operations involved in performing a join between a head thread and a speculative thread in accordance with another embodiment of the present invention.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Monitor Entry and Exit for a Speculative Thread

FIG. 12 illustrates how speculative thread 203 keeps track of locks in order to decide when to commence a join operation accordance with an embodiment of the present invention. During execution of a parallel computational task, head thread 202 performs a fork operation 1202 so that the parallel computational task can proceed using both head thread 202 and other head thread 1204.

Some time after the fork operation, speculative thread 203 begins speculatively executing code for head thread 202 in advance of where head thread 202 is executing.

When head thread 202 reaches the point where speculative thread 203 began executing, head thread 202 communicates a join request 1206 to speculative thread 203. Note that the code section A executed by head thread 202 is the same as the code section A executed by speculative thread 203.

Also note that speculative thread 203 maintains a list of virtual locks 1210 that have been visited by speculative thread 203. Each entry 1212 in list 1210 contains a reference to a corresponding non-virtual lock 1214 that is held by a non-speculative head thread, such as other head thread 1204. Note that this non-virtual lock 1214 can be used to restrict access to an object 1216 and/or a critical section of code. Speculative thread 203 also keeps track of the number of virtual locks that are presently held by speculative thread 203. Note that by holding a virtual lock speculative thread 203 does not prevent another thread from accessing the object or critical section that is protected by the lock. The purpose of the virtual lock is to keep track of whether or not speculative thread 203 is executing within a critical section of code, and whether speculative thread 203 has visited a particular critical section of code.

After speculative thread 203 determines that the number of virtual locks 1218 held by speculative thread 203 equals zero, and that no locks in the list of virtual locks are not currently held by other head threads, speculative thread 203 commences the join operation 1208. The process of determining when to commence the join operation is described in more detail below with reference to FIGS. 13–15.

FIG. 13 is a flow chart illustrating the process of performing a monitor entry in accordance with an embodiment of the present invention. During a monitor entry, speculative thread 203 increments the number of virtual locks 1218 (step 1302), and then adds an entry for the virtual lock into the list of virtual locks 1210 (step 1304).

FIG. 14 is a flow chart illustrating the process of performing a monitor exit in accordance with an embodiment of the present invention. During a monitor exit, speculative thread 203 decrements the number of virtual locks 1218 (step 1402). Next, if the number of virtual locks equals zero, and if no locks in the list of virtual locks are currently held by other head threads, speculative thread 203 commences a join operation with head thread 202, if such a join operation is pending (step 1404).

Figure 15:
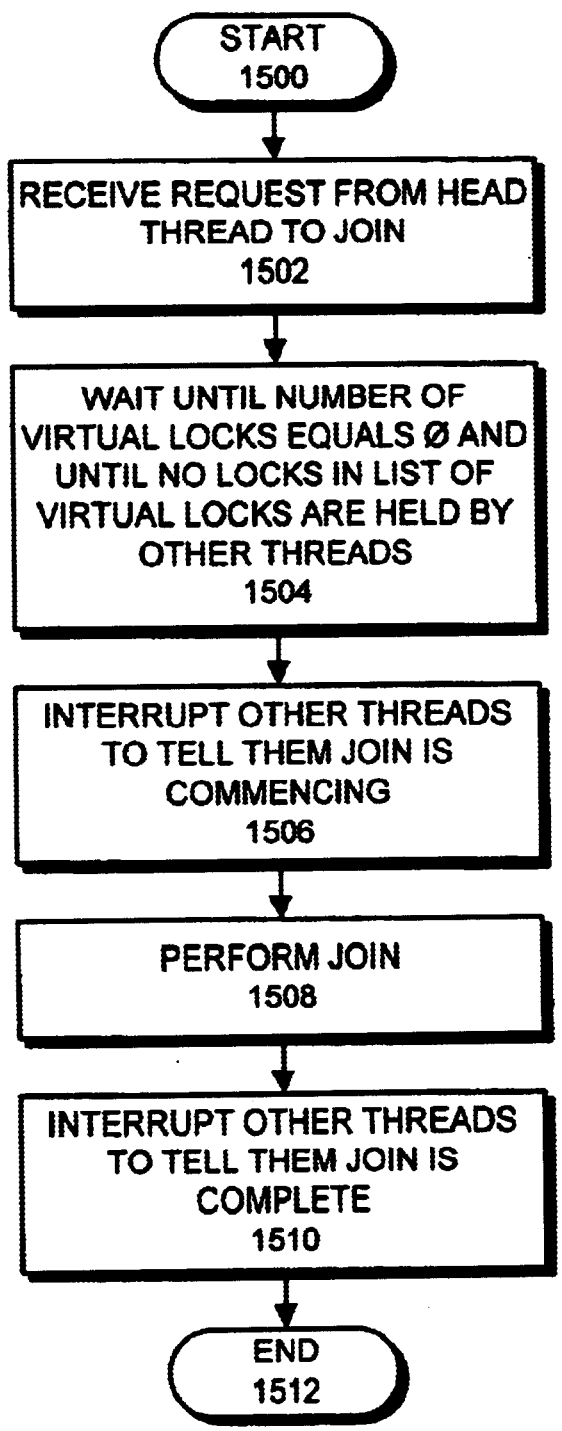
FIG. 15 is a flow chart illustrating the process of preparing for a join operation in accordance with an embodiment of the present invention.

FIG. 15 is a flow chart illustrating the process of preparing for a join operation in accordance with an embodiment of the present invention. After head thread 202 reaches the point where speculative thread 203 began executing, speculative thread 203 receives a request from head thread 202 to commence the join operation (step 1502). Before commencing the join operation, speculative thread 203 waits until the number of virtual locks 1218 equals zero. This ensures that speculative thread 203 completes all outstanding critical sections before merging its state with head thread 202.

Speculative thread 203 also waits until none of the locks in the list of virtual locks 1210 is held by other head threads (step 1504). This ensures that the process of joining speculative thread 203 into head thread 202 does not cause changes to data associated with a critical section while another head thread is operating in the critical section.

The head thread 202 acquires the locks, while speculative thread 203 carries on with speculative execution. If all of these locks can be acquired, none of the other head threads are holding these locks.

Next, the system interrupts the other threads to tell them then the join operation is commencing (step 1506). This prevents the other threads from accessing data that might be inconsistent during the join operation. Head thread 202 and speculative thread 203 then perform the join operation, which involves merging state between speculative thread 203 and head thread 202 (step 1508). After the join operation is complete, head thread 202 interrupts the other threads to tell them the join operation incomplete (step 1510). Note that the list of versioned objects can be easily partitioned to facilitate using multiple threads in performing the join operation in parallel.

Also note that the present invention is not limited to monitor entry and monitor exit functions. The present invention can generally be applied to any mutual exclusion variable, such as a mutual exclusion variable associated with a spin lock, a semaphore, a read-writer lock, a turnstile, a mutex lock, an adaptive mutex lock, or any other mutual exclusion mechanism.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for handling critical sections for a speculative thread, the method operating in a system that supports a head thread that executes program instructions and the speculative thread that speculatively executes program instructions in advance of the head thread, the method comprising:

during an entry into a critical section by the speculative thread, incrementing a variable containing a number of virtual locks held by the speculative thread;

wherein a virtual lock held by the speculative thread is associated with the critical section and is used to keep track of the fact that the speculative thread entered the critical section;

wherein the virtual lock does not prevent the speculative thread or other threads from entering the critical section;

during an exit from the critical section by the speculative thread, decrementing the variable containing the number of virtual locks held by the speculative thread;

receiving a request to perform a join operation with the head thread, the join operation merging state associated with the speculative thread into state associated with the head thread; and waiting to perform the join operation until the variable containing the number of virtual locks held by the speculative thread equals zero.

2. The method of claim 1, wherein the system additionally supports other head threads that execute program instructions for a parallel computational task in parallel with the head thread, and wherein the method further comprises:

during the entry into the critical section by the speculative thread, adding an entry for the virtual lock associated with the critical section into a list of virtual locks visited by the speculative thread; and waiting to perform the join operation until no virtual locks in the list of virtual locks are held by the other head threads.

3. The method of claim 2, wherein waiting to perform the join operation until no virtual locks in the list of virtual locks are held by the other head threads involves using the head thread to acquire non-virtual locks associated with virtual locks in the list of virtual locks.

4. The method of claim 2, wherein the entry for the virtual lock in the list of virtual locks contains an identifier for a corresponding non-virtual lock for the critical section, wherein the non-virtual lock is used to ensure mutual exclusion amongst the head thread and the other head threads working on the parallel computational task.

5. The method of claim 1, wherein during a write operation to a memory element by the head thread, the method further comprises:

performing the write operation to a primary version of the memory element;

checking status information associated with the memory element to determine if the memory element has been read by the speculative thread;

if the memory element has been read by the speculative thread, causing the speculative thread to roll back so that the speculative thread can read a result of the write operation; and if the memory element has not been read by the speculative thread, performing the write operation to a space-time dimensioned version of the memory element if the space-time dimensioned version exists.

6. The method of claim 5, wherein performing the join operation includes merging the space-time dimensioned version of the memory element into the primary version of the memory element and discarding the space-time dimensioned version of the memory element.

7. The method of claim 5, wherein the memory element includes an object defined within an object-oriented programming system.

8. The method of claim 1, wherein the head thread and the speculative thread perform the join operation in parallel.

9. An apparatus that facilitates handling critical sections for a speculative thread, comprising:

a head thread that executes program instructions;

the speculative thread that speculatively executes program instructions in advance of the head thread;

a critical section mechanism for the speculative thread that is configured to, increment a variable containing a number of virtual locks held by the speculative thread during an entry into a critical section by the speculative thread, and to decrement the variable containing the number of virtual locks held by the speculative thread during an exit from the critical section by the speculative thread, wherein a virtual lock held by the speculative thread is associated with the critical section and is used to keep track of the fact that the speculative thread entered the critical section, wherein the virtual lock does not prevent the speculative thread or other threads from entering the critical section; and a joining mechanism that is configured merge state associated with the speculative thread into state associated with the head thread;

wherein the joining mechanism is configured to wait to perform the join operation until the variable containing the number of virtual locks held by the speculative thread equals zero.

10. The apparatus of claim 9, further comprising other head threads that execute program instructions for a parallel computational task in parallel with the head thread, and wherein the critical section mechanism is further configured to:

add an entry for the virtual lock associated with the critical section into a list of virtual locks visited by the speculative thread during the entry into the critical section by the speculative thread, and to wait to perform the join operation until no virtual locks in the list of virtual locks are held by the other head threads.

11. The apparatus of claim 10, wherein the critical section mechanism is configured to wait to perform the join operation by using the head thread to acquire non-virtual locks associated with virtual locks in the list of virtual locks.

12. The apparatus of claim 10, wherein the entry for the virtual lock in the list of virtual locks contains an identifier for a corresponding non-virtual lock for the critical section, wherein the corresponding non-virtual lock is used to ensure mutual exclusion amongst the head thread and the other head threads working on the parallel computational task.

13. The apparatus of claim 9, further comprising a mechanism that performs write operations for the head thread, the mechanism being configured to:

perform a write operation to a primary version of a memory element;

check status information associated with the memory element to determine if the memory element has been read by the speculative thread;

cause the speculative thread to roll back so that the speculative thread can read a result of the write operation if the memory element has been read by the speculative thread; and perform the write operation to a space-time dimensioned version of the memory element if the space-time dimensioned version exists and if the memory element has not been read by the speculative thread.

14. The apparatus of claim 13, wherein the joining mechanism is configured to:

merge the space-time dimensioned version of the memory element into the primary version of the memory element; and to discard the space-time dimensioned version of the memory element.

15. The apparatus of claim 13, wherein the memory element includes an object defined within an object-oriented programming system.

16. The apparatus of claim 9, wherein the head thread and the speculative thread are configured to perform the join operation in parallel.

17. A computer-readable storage medium storing instructions that when executed by a computer cause the computer to perform a method for handling critical sections for a speculative thread, the method operating in a system that supports a head thread that executes program instructions and the speculative thread that speculatively executes program instructions in advance of the head thread, the method comprising:

during an entry into a critical section by the speculative thread, incrementing a variable containing a number of virtual locks held by the speculative thread;

wherein a virtual lock held by the speculative thread is associated with the critical section and is used to keep track of the fact that the speculative thread entered the critical section;

wherein the virtual lock does not prevent the speculative thread or other threads from entering the critical section;

during an exit from the critical section by the speculative thread, decrementing the variable containing the number of virtual locks held by the speculative thread;

receiving a request to perform a join operation with the head thread, the join operation merging state associated with the speculative thread into state associated with the head thread; and waiting to perform the join operation until the variable containing the number of virtual locks held by the speculative thread equals zero.

18. The computer-readable storage medium of claim 17, wherein the system additionally supports other head threads that execute program instructions for a parallel computational task in parallel with the head thread, and wherein the method further comprises:

during the entry into the critical section by the speculative thread, adding an entry for the virtual lock associated with the critical section into a list of virtual locks visited by the speculative thread; and waiting to perform the join operation until no virtual locks in the list of virtual locks are held by the other head threads.

19. The computer-readable storage medium of claim 18, wherein waiting to perform the join operation until no virtual locks in the list of virtual locks are held by the other head threads involves using the head thread to acquire non-virtual locks associated with virtual locks in the list of virtual locks.

20. The computer-readable storage medium of claim 18, wherein the entry for the virtual lock in the list of virtual locks contains an identifier for a corresponding non-virtual lock for the critical section, wherein the non-virtual lock is used to ensure mutual exclusion amongst the head thread and the other head threads working on the parallel computational task.

21. The computer-readable storage medium of claim 17, wherein during a write operation to a memory element by the head thread, the method further comprises:

performing the write operation to a primary version of the memory element;

checking status information associated with the memory element to determine if the memory element has been read by the speculative thread;

if the memory element has been read by the speculative thread, causing the speculative thread to roll back so that the speculative thread can read a result of the write operation; and if the memory element has not been read by the speculative thread, performing the write operation to a space-time dimensioned version of the memory element if the space-time dimensioned version exists.

22. The computer-readable storage medium of claim 21, wherein performing the join operation includes merging the space-time dimensioned version of the memory element into the primary version of the memory element and discarding the space-time dimensioned version of the memory element.

* * * * *